INVENTORS
HANS STEINBRENNER
HANS-JÖRG FLORUS
PAUL SCHWERDT

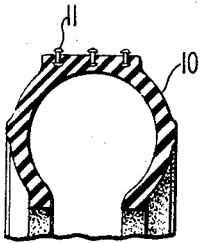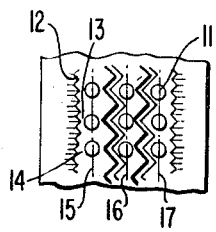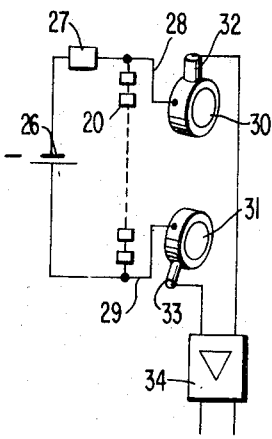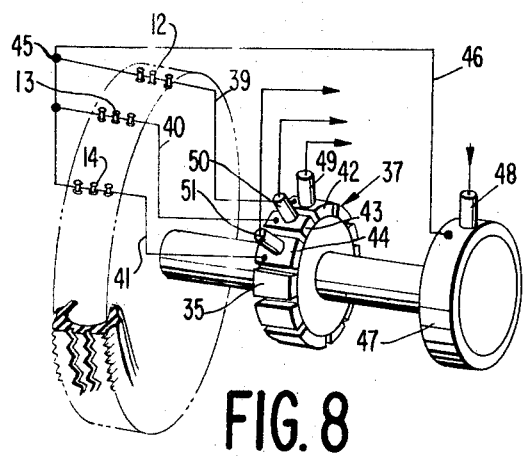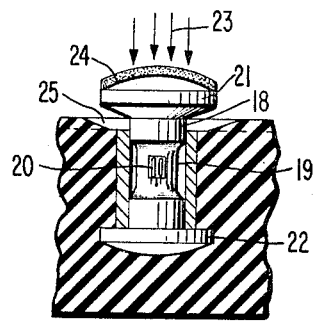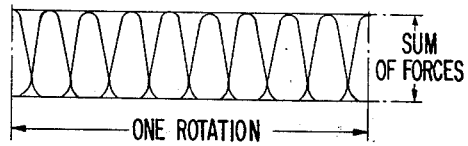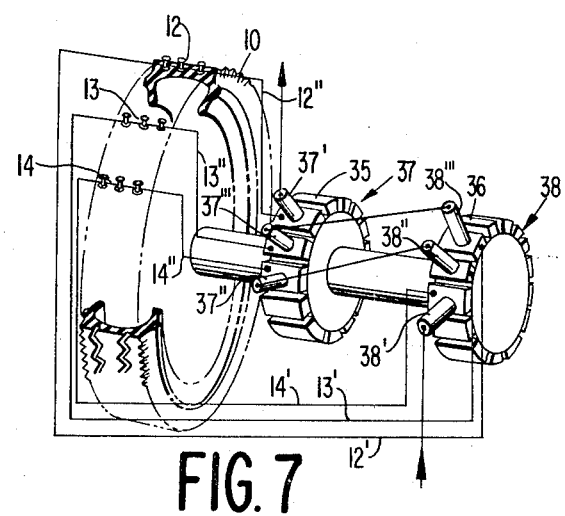

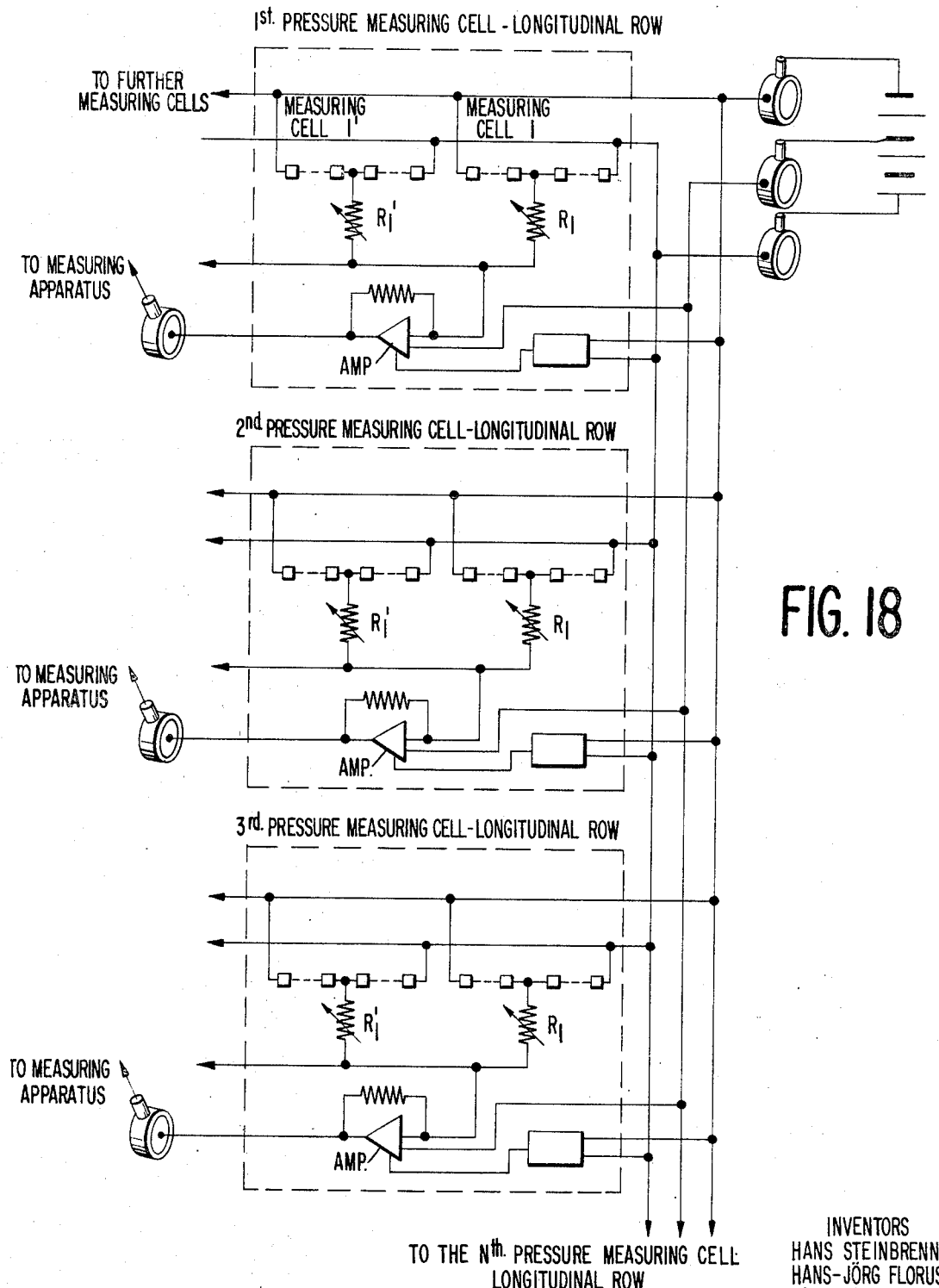

United States Patent Office 3,523,449
Patented Aug. 11, 1970

3,523,449
INSTALLATION FOR MEASURING THE
DYNAMIC WHEEL LOAD
Hans Steinbrenner, Stuttgart, Hans-Jörg Florus, Goppingen, and Paul Schwerdt, Esslingen-Hegensberg, Germany, assignors to Daimler-Benz Aktiengesellschaft, Stuttgart-Unterturkheim, Germany
Filed Nov. 15, 1968, Ser. No. 776,027
Claims priority, application Germany, Nov. 15, 1967,
1,648,443
Int. Cl. B60c *19/00*
U.S. Cl. 73—146         23 Claims

ABSTRACT OF THE DISCLOSURE

An installation for measuring the dynamic wheel load of tires or of the road force which includes force-measuring members built into the contact surface of the tire that produce signals indicative of these forces. A commutator and slip ring device is connected to the force-measuring members to receive the signals and render the necessary readout.

---

The present invention relates to an installation for measuring the dynamic wheel load of tires or of the road force.

Installations are known in the prior art in which the dynamic wheel load is determined in that one measures the distance between road surface and wheel, and in that one calculates therefrom, possibly with the aid of the spring characteristic of the tire, the existing wheel load. With one of these prior art installations, the road surface is sensed by means of an installation disposed alongside the wheel and is thus electrically detected by condenser plates as distance changes. However, quite different conditions may prevail alongside the wheel than at the contact surface of the tire. Additionally, this prior art method is sensitive to atmospheric influences and weather.

It is the aim of the present invention to provide an installation by means of which it is possible to measure the dynamic wheel load or road force in the contact or tread surface of the tire.

As solution to the underlying problems, the present invention proposes that force measuring members are built into the tread or contact surface of the tire. It is then always possible to undertake the measurements at those places which are, in fact, subjected to the load or loads. The smaller the measuring members are constructed, the more it is possible to detect the wheel load or road force point by point. An equivalent installation according to the present invention would consist in inserting or embedding such force-measuring members into a road surface. One could then drive over such a road surface by means of unprepared tires. However, one would have to provide such force-measuring members in a relatively large number over a longer distance. If, however, one installs the force-measuring member into the tire, then one can drive with such tires over any desired distance and road.

By installing the measuring members into the tread or road contact surface of the tire, it is possible to convert the wheel load into an electric magnitude in a simple manner.

Moreover, according to a further feature of the present invention, by utilizing a measuring member with a shank that is reduced within the area of the strain gauge, it is possible to achieve a particularly large output signal because with the aid of the reduced portion of the force member, the strain gauge can be considerably more elongated, or compressed than is the case with measuring "spikes" without reduced portions.

By arranging the strain gauges mutually opposite, preferably at about 180° along the circumference of the reduced portion of the force-measuring member, it is also possible to compensate the bending forces, undesirable for the measurement results which act on the measuring spikes.

By the use of mushroom-like caps at both ends of the shank of a measuring spike and by the use of a rubber layer carried by the cap disposed along the tire circumference, one achieves, on the one hand, that the measuring spike is securely held in the tire and, on the other, that conditions similar to a normal tire occur during the driving with the measuring spikes.

If the force-measuring member is a cell which includes two bottoms that are rigidly connected with each other by means of a column located approximately in the center of the bottoms, of which one of the bottoms carries preferably radially arranged strain gauges while the column carries a mushroom-shaped cap after passage through the outer bottom, one obtains a precise and accurate guidance of the column. A tilting or canting by reason of transverse forces is not possible with such an arrangement. Furthermore, the strain gauges are protected if they are provided at the inner bottom of the cell.

The effect of the strain gauges can be doubled and additionally thermal influences or the like can be compensated for if the strain gauges are accommodated one above the other to both sides of the bottom of the cell and are appropriately connected in series with one another.

According to another feature in accordance with the present invention a proportional voltage change results when the strain gauges are elongated or compressed, if the strain gauges are connected in series in a circuit of a standard voltage source and if this series connection is provided with an output branch circuit at the two ends thereof.

A simple removal of the useful output signals is achieved by the system according to the present invention if each output line is electrically connected with a slip ring that is non-rotatably connected with the tire for rotation in unison therewith and if brushes are provided at the slip rings for taking off the signal.

Additionally, it is possible according to another feature of the present invention to determine in a simple manner how large the sum of the forces is in one directional row, when this row forms a part of the tread or contact surface of the tire, if the force-measuring members arranged in the transverse rows of the tire are connected in series while a commutator is provided that possesses as many segments as there are transverse rows, and if each transverse row is connected with a respective segment.

The arrangement can be further simplified according to the present invention so as to require only a single commutator, by replacing the second, otherwise necessary commutator by a slip ring, if the commutator and slip ring are non-rotatably connected with the tire and if a line leads from the slip ring to the base of all series-connected force-measuring members.

According to a further feature of the present invention, if the number of commutators which are non-rotatably connected with the tire is equal to the number of force-measuring members in the longitudinal rows, if each commutator has as many segments as there are transverse rows, and if each force-measuring member is connected with a segment of the commutator associated with the corresponding longitudinal row, then the wheel load can be determined for each individual force-measuring member of a transverse row and thus, for example, a wheel load characteristic curve can be determined from the large number of measuring points.

According to a still further feature in accordance with the present invention, if the strain gauges are connected in series in the desired manner in a branch of a carrier frequency bridge whose input and output are connected by way of conventional transmitting means devoid of slip rings and if the carrier frequency bridge rotates in unison with the tire, then the noise which is normally produced by slip rings and/or commutators can be avoided, which is of great importance because such background noise signals might adversely affect the normally relatively weak signals from the strain gauges.

According to another construction in accordance with the present invention, if those strain gauges of a force-measuring member which are loaded in tension during the occurrence of a wheel load, are connected in series in one branch of a rotating half-bridge and if the remaining strain gauges are series-connected in the other branch of the half-bridge while the two input terminals of the half-bridge are connected with slip rings and the output terminal of the half-bridge is connected with a rotating amplifier whose output is connected with a further slip ring, and if the reference voltage is supplied to the rotating parts by means of a slip ring and a rotating voltage source is provided which is fed by way of the slip rings and is electrically separate from the half-bridge, then one achieves the advantages of a current supply by way of slip rings, yet realizes a large signal-to-noise ratio.

These and other features, objects, and advantages of the present invention will become more obvious from the following description when taken in connection with the accompanying drawing which shows, for purposes of illustration only, several embodiments in accordance with the present invention, and wherein:

FIG. 1 is a partial cross-sectional view through a tire provided with installed measuring spikes in accordance with the present invention;

FIG. 2 is a partial plan view on the tire of FIG. 1;

FIG. 3 is a partial cross-sectional view, on an enlarged scale, of a measuring spike and its surrounding parts in a tire according to the present invention;

FIG. 4 is a schematic wiring diagram of one control circuit in accordance with the present invention;

FIG. 5 is a representation of the signals obtainable with the present invention;

FIG. 6 is a second representation of signals obtainable in accordance with the present invention;

FIG. 7 is a schematic simplified perspective view of a tire provided with measuring spikes as well as the commutators used in connection therewith in accordance with the present invention;

FIG. 8 is a simplified schematic perspective view, similar to FIG. 7, of a modified embodiment of a tire provided with measuring spikes as well as of the associated commutators in accordance with the present invention;

FIG. 18 is a schematic wiring diagram of a still further modified embodiment in accordance with the present invention.

Figure 9:
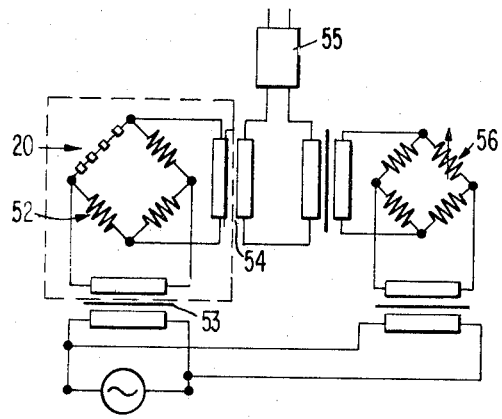
FIG. 9 is a schematic wiring diagram for a transmission without slip rings in accordance with the present invention.
Figure 11:
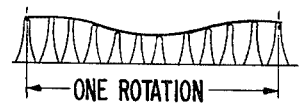
FIG. 11 is a representation of signals obtainable in accordance with the present invention.

Referring now to the drawing wherein like reference numerals are used throughout the various views to designate like parts, and more particularly to FIGS. 1 and 2, reference numeral 10 designates therein an otherwise conventional tire, into which are inserted measuring spikes 11 with characteristics that are as similar as possible.

The spikes 11 are so arranged that transverse rows 12, 13, 14 etc. result. Furthermore, they are so arranged that they also produce longitudinal rows 15, 16 and 17.

A measuring spike illustrated in greater detail in FIG. 3 includes a shank or steam portion 18 which has a reduced portion 19 approximately in its center area. Strain gauges 20 of any conventional construction are suitably secured in any conventional manner on this reduced portion 19, for example, by gluing, cementing, etc. A strain gauge (not shown) is also adhesively secured to the side of the reduced portion 19 that is disposed diametrically opposite the strain gauge 20 shown in FIG. 3. On both sides of the shank portion 18 are provided mushroom-like caps 21 and 22, of which the cap 22 serves for the anchoring of the spike 11 in the tire 10 and for the further purpose that the measuring spike 11 is not excessively pressed into the tire 10 by the forces 23.

The cap 21 is covered or coated with rubber 24 so that during the drive a condition similar to a normal tire results. An aperture or recess 25 in the tire 10 assures that also very large forces 23 are not in the position to press the measuring spike 11 so far into the tire 10 that it abuts with its cap 21 on the tire. In that event, all of the forces would no longer be measured but only a part thereof.

If one connects the strain gauge 20 to a voltage source, and if one permits the tire to roll off along the ground, then one can take off a voltage from the strain gauge 20, as is illustrated in FIG. 5. If one indicates or draws in all pulses which are produced, for example, by the spikes of the longitudinal row 15, then one obtains the voltage curve illustrated in FIG. 6 (for one rotation in the case of a constant force-plane road-surface).

A control circuit which can be used for that purpose is illustrated in FIG. 4. A high-ohmic resistance 27 is connected in series with a battery 26 so that a standard current is produced. Series-connected strain gauges 20 of one longitudinal row are connected into this standard current circuit. The series-connection of the strain gauges 20 is provided at each of its two ends with an output line 28 and 29 that lead to a slip ring 30 and 31, respectively. The slip rings 30 and 31 rotate in unison with the tire 10. The voltage is taken off from the slip rings 30 and 31 with the aid of brushes 32 and 33 and are fed to an amplifier 34 of conventional construction. Of course, in the output of this amplifier 36, one no longer obtains a voltage curve according to FIG. 6 but instead the sum of the voltage curves illustrated in this figure.

The strain gauges 20 may also belong to a transverse row and would then indicate the sum of the forces in the transverse direction.

If one desires to measure the sum of the spikes disposed in a predetermined area, for example, in the contact or tread surface of the tire, then a control circuit according to FIG. 7 is recommended. The transverse rows 12, 13 and 14 are used in that case for the measurement. Commutators generally designated by reference numerals 37 and 38 which are provided with segments 35 and 36, respectively, rotate in unison with the tire 10.

One can recognize without difficulty from the indicated circuit diagram that the voltages of the measuring spikes in question are added in this embodiment since a series-connection exists from brush 38′ by way of line 14′, row 14, line 14″, commutator 37, brush 37″, brush 38″, line 13', row 13, line 13", brush 37"', brush 38"", line 12', row 12, line 12" and brush 37. The output thus takes place at brushes 37' and 38'. One is able in a surprisingly simple manner to determine with this circuit the sum of the forces of a tread or contact surface if one adds as many transverse rows as belong to a contact surface.

If one desires to determine simultaneously the sum of the forces, for example, of three transverse rows 12, 13 and 14, then one utilizes the arrangement illustrated in FIG. 8. As in FIG. 7, the commutator generally designated by reference numeral 37 of the embodiment of FIG. 8 also has as many segments 35 as there are transverse rows 12, 13, 14 etc. Each transverse row is connected by way of a separate line 39, 40, and 41 to the corresponding segment 42, 43 and 44. The base or interconnection of all transverse rows 12, 13 and 14 is itself connected with a slip ring 47 by way of a line 46 whose voltage is taken off by means of a brush 48. One obtains, respectively, the sum of the voltages of the transverse rows 12, 13 and 14 at the bruhes 49, 50 and 51.

As is known, slip rings and even more so, the commutators produce interference voltages or noise signals which may disturb the weak signals of the measuring strain gauges. If one desires to avoid such disturbances, then one utilizes a circuit according to FIG. 9. In this embodiment, the strain gauges 20 are connected in a bridge generally designated by reference numeral 52 which is fed by means of a conventional transmitter 53 whose primary part stands still and whose secondary part rotates in unison with the tire 10. In a corresponding manner, the output of the bridge 52 is connected by way of a slip ringless transmitter 54 of any conventional construction having a rotating primary and stationary secondary part. The voltage is conducted from the transmitter 54 to a carrier frequency apparatus 55 of known type. In order to be able to balance the bridge 52, a second balancing bridge generally designated by reference numeral 56 is connected in parallel therewith which is accessible from the outside and by means of which balancing can be realized.

The measuring methods so far described related, for the most part, to the detection of the entire road surface force. However, oftentimes the distribution of the existing road forces within the tread or contact surface of the tire are also of interest, in particular during the dynamic operation. An approach to such a solution has already been indicated in FIG. 8, for in FIG. 8 the entire force of a line of the contact surface was measured and was taken off as electric magnitude by way of slip rings and collectors.

Figure 13:
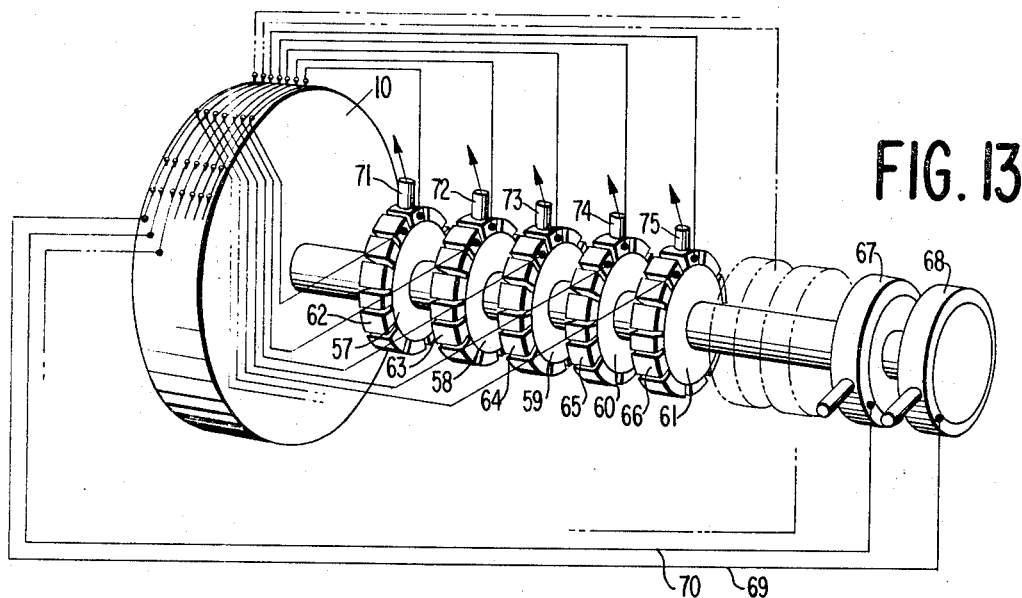
FIG. 13 is a schematic perspective, simplified view, partly in cross section, of a tire provided with measuring spikes and of associated commutators in accordance with the present invention.

If one seeks now to measure also the distribution of the force in a transverse direction of the tire 10, then an arrangement according to FIG. 13 is recommended.

Figure 10:
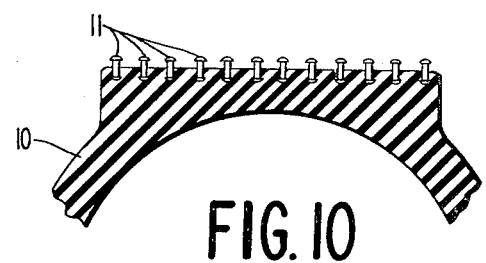
FIG. 10 is a partial cross-sectional view, similar to FIG. 1, through a modified embodiment of a tire in accordance with the present invention.
Figure 12:
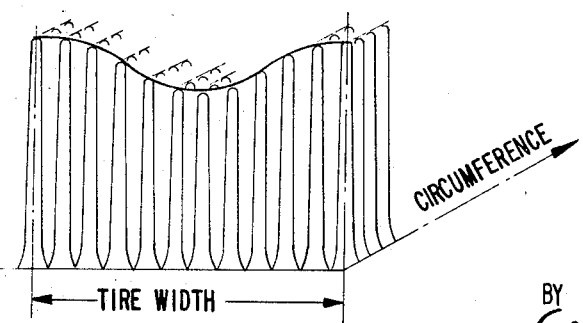
FIG. 12 is a further representation of signals obtainable with the present invention.

In order to understand the system of FIG. 13, reference is made at first to FIG. 10. A number of measuring spikes 11 are arranged on the tread or contact surface of the tire 10 in FIG. 10. In FIG. 12, the pressure pulses are illustrated which result when such a tire rolls along the road surface. One can see from an analysis of FIG. 12 that for the purpose of representation of the force curve over the cross section of the tire 10, as many indicating or recording instruments are necessary as there are pressure cells in the transverse row. If one utilizes, for example, a loop oscillograph or a moving coil oscillograph, then as many galvanometers are necessary as one has pressure cells in a transverse row of the tire. In the illustrated embodiment, for example, twelve measuring spikes 11 were used. If one now additionally seeks the force curve plotted against time, then it is only necessary to connect in series with each other each measuring spike 11 of a longitudinal row. One obtains then the force diagrams of the twelve longitudinal rows at the twelve galvanometers as is shown in FIG. 12.

The aimed-at goal is achieved with an installation according to FIG. 13. As many commutators 57, 58, 59, 60, 61 etc. are provided in this embodiment as are present longitudinal rows. Additionally, each of the commutators 57 to 61 has as many segments 62, 63, 64, 65, 66 etc. as there are present longitudinal rows. The voltage supply of the spikes takes place by way of slip rings 67, 68 etc. which are present in the same number as there are longitudinal rows in the tire 10. Lines 69, 70 etc. lead from the slip rings 67, 68, etc. to the individual longitudinal rows which are supplied in common with voltage. For example, carrier frequency apparatus of conventional type are connected to the brushes 71, 72, 73, 74, 75, etc. which are connected in series with the loop oscillographs or galvanometers of the oscillographs.

Figure 14:
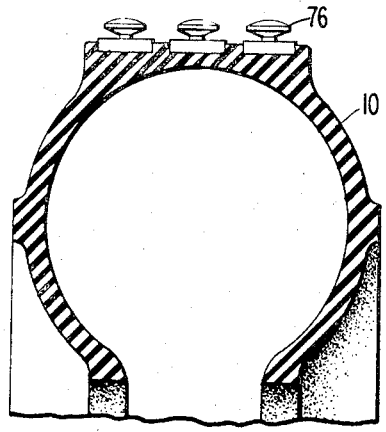
FIG. 14 is a partial cross-sectional view through a tire with pressure cells installed into the same in accordance with the present invention.
Figure 16:
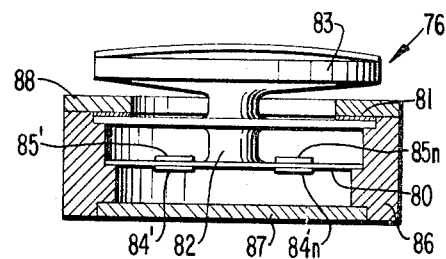
FIG. 16 is a cross-sectional view, on an enlarged scale, through a pressure cell and the surrounding parts in accordance with the present invention.
Figure 15:
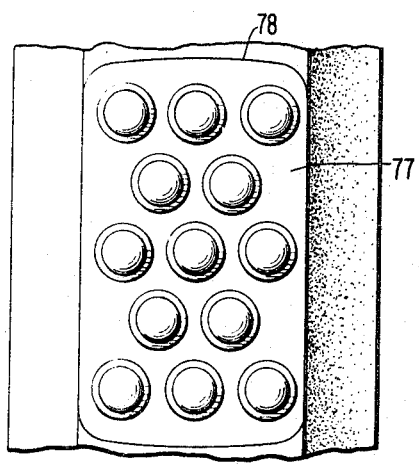
FIG. 15 is a partial plan view on the tire of FIG. 14 with the tread or contact surface of the tire indicated in this view.

Instead of the measuring spikes 11, one can also use pressure cells. According to FIG. 14, these pressure cells 76 are partly inserted into the tire 10 similar to the measuring spikes 11. FIG. 15 illustartes the plan view on the tire of FIG. 14. It can be seen from this figure that the force-measuring members need not necessarily be accommodated always at the points of intersection of a right angle coordinate network. FIG. 15 additionally shows a tread or contact surface 77 whose boundaries are indicated by the lines 78 and 79. The pressure cell 76 consists of a housing 86 with covers 87 and 88. To circularly shaped diaphragm bottoms 80 and 81 are clampingly secured within the housing which are rigidly connected with each other by a column 82 provided in the center. The column 82 carries a mushroom-shaped cap 83. The upper bottom 81 serves for the absorption of undesired transverse forces which may impinge upon the cap 83. Thus, only the forces which impinge in the axial direction, are conducted onto the bottom 80. The lower bottom 80 therefore represents the measuring diaphragm. It carries on its lower side the strain gauges $84_1$ to $84_n$. The gauges $85_1$ to $85_n$ are mounted at the upper side of the diaphragm bottom 80. The entire pressure cell is vulcanized into a recess of the tire as can be seen in FIG. 14.

Figure 17:
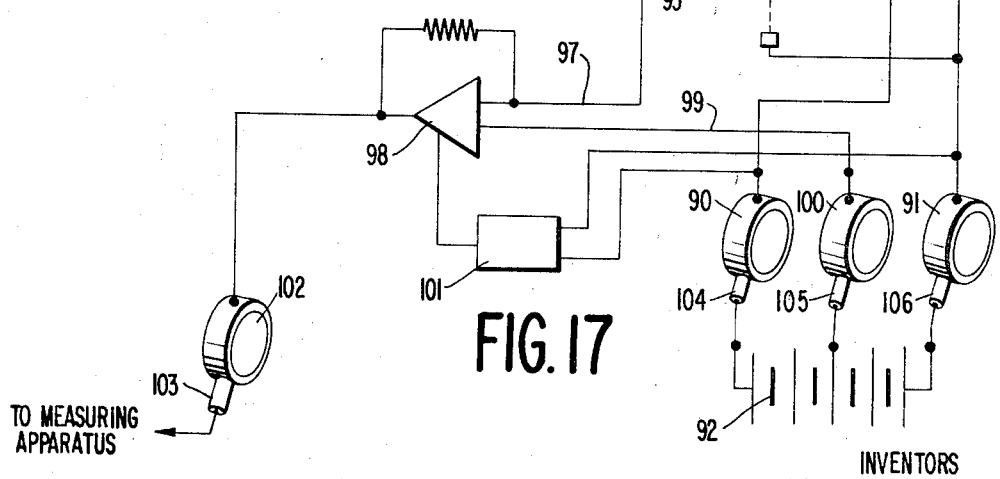
FIG. 17 is a schematic wiring diagram of another embodiment in accordance with the present invention.

A possibility how such pressure cells 76 can be connected is illustrated in FIG. 17. The strain gauges $84_1$ to $84_n$ and $85_1$ to $85_n$ are connected in this embodiment as half-bridges generally designated by reference numeral 89 which is supplied with voltage by way of two slip rings 90 and 91 from a power source 92. In the event the pressure cells do not have exactly the same sensitivity by reason of tolerances conditioned by manufacture, the half-bridges can be balanced by compensating resistances 93, 94, 95.

If the pressure cell 76 is subjected to a load, then the strain gauges $84_1$ to $84_n$ are elongated and the strain gauges $85_1$ to $85_n$ are compressed. This means that the entire resistance of the strain gauges $85_1$ to $85_n$ decreases when the resistance of the other strain gauges $84_1$ to $84_n$ increases so that the voltage shifts or changes at the readout point 96. This voltage decrease is applied by way of a line 97 to an operational amplifier 98 which has a strong negative feedback in the usual manner and is able to sum up voltages. The supply voltage of the amplifier 98 is obtained by way of a line 99 from a slip ring 100 which, as illustrated, is connected by way of a brush 105 to the point of symmetry of the power supply 92. Additionally, a power supply 101 is connected to the slip rings 90 and 91 which supplies to the operational amplifier 98 the necessary voltage or the necessary currents. The output voltage of the amplifier 98 is taken off by way of a slip ring 102 and brush 103 from where it is conducted to the measuring apparatus of any conventional nature.

All of the parts described so far in the embodiment of FIG. 17, with the exception of the power source 92, rotate in unison with the tire 10. Only this power source 92 and the brushes 103, 104, 105 and 106 stand still. It is achieved with this arrangement that an already amplified signal reaches the slip ring 102 which is not lost under any circumstances in the noise produced by the slip ring 102 and the brush 103.

The circuit according to FIG. 18 represents a further improvement which combines the advantages according to FIG. 13 with the advantages according to FIG. 17. In the circuit according to FIG. 18, all commutators 57, 58, 59, 60 and 61 of FIG. 13 are obviated.

Similar to FIG. 17, all pressure cells are fed by way of slip rings. All pressure cells of a respective longitudinal row are then connected to an amplifier. Consequently, as many operational amplifiers are necessary as there are longitudinal rows. The outputs of the operational amplifier are applied to slip rings. The supply of the operational amplifiers takes place in the manner described in connection with FIG. 17.

Of course, with both of the two last-described circuits according to FIGS. 17 and 18, pressure cells 76 as well as measuring spikes 11 can be used as force-measuring members.

While we have shown and described only several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

It is claimed:

1. An installation for measuring the dynamic wheel load of tires or road force, comprising a tire having a force-measuring means built into the road contacting surface of the tire.

2. An installation according to claim 1, wherein the force-measuring means is a spike-like structure having a shank and strain gauge means provided within the area of said shank.

3. An installation according to claim 2, wherein the shank is provided with a reduced portion within the area of the strain gauge means.

4. An installation according to claim 3, wherein the strain gauge means are arranged at the circumference of the reduced portion.

5. An installation according to claim 4, wherein said strain gauge means are disposed with respect to each other by about 180° at the circumference of the reduced portion.

6. An installation according to claim 4, wherein the spike-like structure includes mushroom-like cap means at both ends of the shank, the cap means disposed at the tire circumference being provided with a layer of an elastic material.

7. An installation according to claim 6, wherein said elastic material is a rubber-like layer.

8. An installation according to claim 2, wherein the spike-like structure includes mushroom-like cap means at both ends of the shank, the cap means disposed at the tire circumference being provided with a layer of an elastic material.

9. An installation according to claim 8, wherein said elastic material is a rubber-like layer.

10. An installation according to claim 1, wherein the force-measuring means includes a pressure-cell having two bottom means rigidly connected with each other by a column means approximately in the center of the bottom means, one of said bottom means carrying strain gauge means, and the column means extending through the outer bottom means and carrying a mushroom-like cap means.

11. An installation according to claim 10, wherein said strain gauge means are arranged radially at said one bottom means.

12. An installation according to claim 11, wherein the strain gauge means are mounted at the inner bottom means.

13. An installation according to claim 12, wherein the strain gauge means are accommodated on both sides of said one bottom means.

14. An installation according to claim 13, wherein said strain gauge means are accommodated above each other on both sides of said bottom means.

15. An installation according to claim 10, wherein the strain gauge means are mounted at the inner bottom means.

16. An installation according to claim 15, wherein said strain gauge means are accommodated above each other on both sides of said bottom means.

17. An installation according to claim 1, further comprising circuit means having a reference power source, said force-measuring means including a plurality of strain gauge means series-connected in said circuit means, and output means at both ends of the series connection of said strain gauge means.

18. An installation according to claim 17, wherein each output means is electrically connected with a slip ring means that rotates in unison with the tire, and brush means for taking off the voltages from the slip ring means.

19. An installation according to claim 1, wherein the force-measuring means are arranged in transverse rows, the force-measuring means disposed in a transverse row being connected in series, and commutator means with as many segment means as there are transverse rows, each transverse row being connected with a respective segment means.

20. An installation according to claim 19, further comprising slip ring means, the commutator and slip ring means being non-rotatably connected with the tire, and a line leading from the slip ring means to the base of all series connected force-measuring means.

21. An installation according to claim 1, wherein said force-measuring means are arranged in longitudinal rows, a plurality of commutator means, the number of commutator means corresponding to the number of longitudinal rows and being non-rotatably connected with the tire, each commutator means having as many segments as there are transverse rows, and each force-measuring means being connected with a segment of the commutator means associated with its longitudinal row.

22. An installation according to claim 1, wherein the force-measuring means include strain gauge means series-connected in predetermined manner in a branch circuit of a carrier frequency bridge means having input and output means operatively connected with transmitter means devoid of slip rings, said carrier frequency bridge means rotating in unison with the tire.

23. An installation according to claim 1, wherein the force-measuring means include strain-gauge means, those strain gauge means of a force-measuring means which are stressed in tension during the occurrence of a wheel load are series-connected in one branch circuit of a rotating half-bridge means, the remaining strain gauge means being series-connected in the other branch of said half-bridge means, said bridge means being provided with input means connected with a power source by way of slip ring means, output means in said half-bridge means being operatively connected with a rotating amplifier means having output means operatively connected with a further slip ring means, the reference voltage being supplied to the rotating parts by way of a slip ring means, and rotating current-supply means for said amplifier means galvanically separate from said half-bridge means and fed by said slip ring means.

References Cited

UNITED STATES PATENTS 3,019,642   2/1962   Gallager _____ 73—746

DONALD O. WOODIEL, Primary Examiner

U.S. Cl. X.R.

152—330